United States Patent [19]

Perry

[11] Patent Number: 4,751,816
[45] Date of Patent: Jun. 21, 1988

[54] TURBOFAN GAS TURBINE ENGINE

[75] Inventor: Derick A. Perry, Derby, England

[73] Assignee: Rolls-Royce plc, London, England

[21] Appl. No.: 79,994

[22] Filed: Jul. 31, 1987

[30] Foreign Application Priority Data

Oct. 8, 1986 [GB] United Kingdom ............... 8624163

[51] Int. Cl.[4] ............................................. F02K 3/072
[52] U.S. Cl. ................. 60/226.1; 60/39.162; 60/268; 416/129
[58] Field of Search ................. 60/226.1, 39.162, 268, 60/262; 416/129, 128, 171, 170 R

[56] References Cited

U.S. PATENT DOCUMENTS

| 3,448,582 | 6/1969 | Bracey et al. | 60/39.162 |
| 3,729,957 | 5/1973 | Petrie et al. | 60/268 |
| 3,830,058 | 8/1974 | Ainsworth | 60/226.1 |
| 3,861,139 | 1/1975 | Jones | 60/226.1 |

FOREIGN PATENT DOCUMENTS 2155110 9/1985 United Kingdom ............... 60/226.1

Primary Examiner—Donald E. Stout
Attorney, Agent, or Firm—Cushman, Darby & Cushman

[57] ABSTRACT

An improved arrangement of a turbofan engine comprises a core engine, an upstream fan, a downstream fan and a booster compressor. The upstream fan and downstream fan are both positioned upstream of the core engine, and are arranged to be driven in opposite directions by a gear assembly. The gear assembly is positioned axially between the upstream fan and downstream fan. The booster compressor is positioned upstream of the upstream fan and downstream fan, and comprises a first rotor carrying blades and a second rotor carrying blades. The first rotor is driven with the upstream fan and the second rotor is driven by the turbine of the core engine in opposite direction to the first rotor.

8 Claims, 2 Drawing Sheets

TURBOFAN GAS TURBINE ENGINE

The present invention relates to turbofan gas turbine engines, and is particularly concerned with turbofan gas turbine engines which have a fan or fans positioned upstream of a core engine.

Turbofan gas turbine engines of this type have problems in that air flowing to a core engine or a booster compressor has to flow initially through the fan or fans and this is detrimental to the core engine or booster compressor.

The present invention is also concerned with providing a gear arrangement to drive the fans.

The present invention seeks to provide a geared turbofan gas turbine with two fans rotating in opposite directions in which the above problems are alleviated.

Accordingly the present invention provides a turbofan gas turbine engine comprising a core engine, an upstream fan, a downstream fan and a booster compressor, the core engine comprising in flow series compressor means, combustor means and turbine means, the upstream fan and downstream fan being positioned upstream of the core engine, a gear assembly driven by the turbine means being positioned axially between the upstream fan and the downstream fan, the gear assembly being arranged to drive the upstream fan and downstream fan in opposite directions, the booster compressor comprising a first rotor carrying a plurality of radially extending blades, a second rotor carrying a plurality of radially extending blades, the first rotor being driven with the upstream fan and the second rotor being driven directly by the turbine means, the first rotor and second rotor rotating in opposite directions.

The gear assembly may comprise a sun gear, a plurality of planet gears meshing with the sun gear and an annulus gear meshing with the planet gears, the planet gears being rotatably mounted in and arranged to drive a planet carrier, the planet carrier being drivingly connected to the downstream fan and the annulus gear being drivingly connected to the upstream fan.

The first rotor of the booster compressor may have a plurality of radially inwardly extending blades, and the second rotor of the booster compressor may have a plurality of radially outwardly extending blades.

The first rotor of the booster compressor may have a plurality of radially outwardly extending blades, and the second rotor of the booster compressor may have a plurality of radially inwardly extending blades.

The upstream fan may be rotatably mounted on the planet carrier by axially spaced bearings, the bearings being positioned axially on each side of the gear assembly.

The downstream fan may be rotatably mounted on an axially extending static structure, the static structure being secured to the core casing.

The downstream fan may be rotatably mounted on the axially extending static structure by axially spaced bearings.

The present invention will be more fully described by way of example with reference to the accompanying drawings in which.

Figure 1:
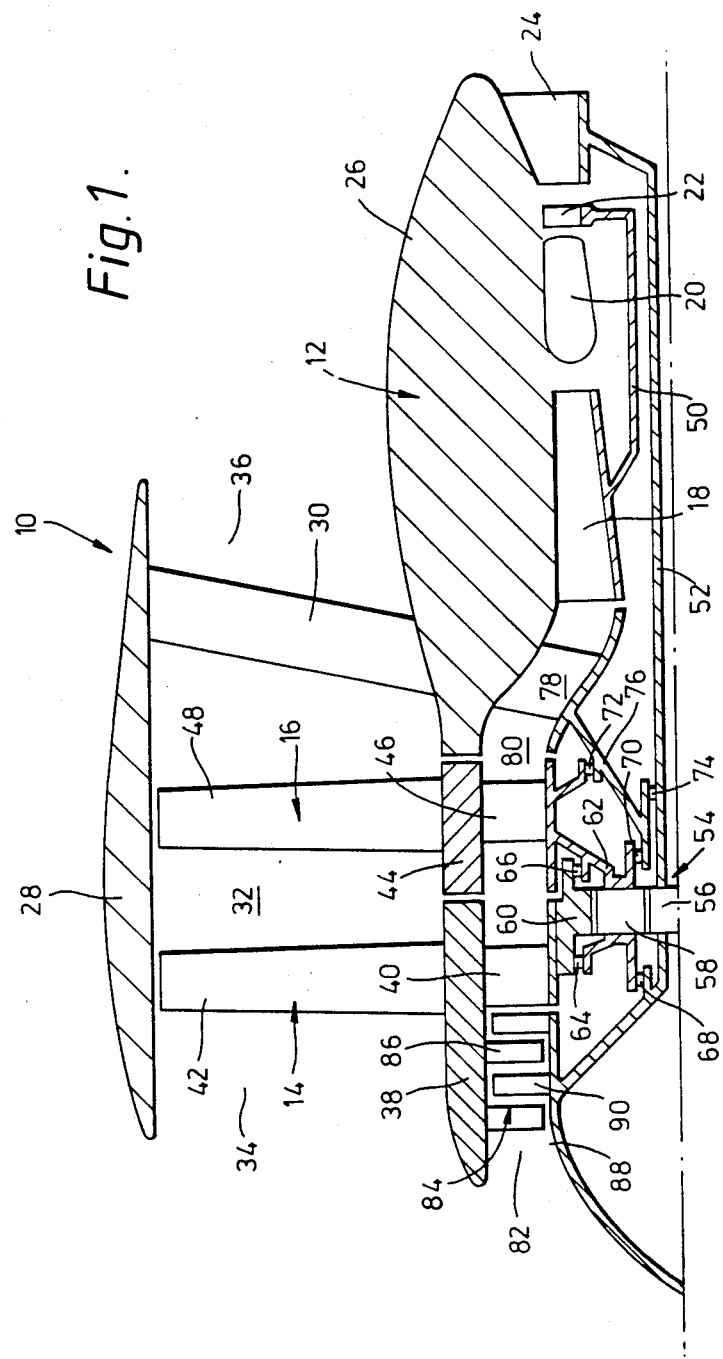
FIG. 1 shows a turbofan gas turbine engine according to the present invention.

A turbofan gas turbine engine 10 comprises a core engine 12, an upstream fan 14, a downstream fan 16 and a booster compressor 84. The core engine 12 comprises in flow series a compressor 18, a combustor 20, a high pressure turbine 22 and a low pressure turbine 24. The core engine 12 is enclosed by a core casing 26.

The upstream fan 14 and the downstream fan 16 are positioned upstream of the core engine 12, and the fans are enclosed by a fan casing 28. The fan casing 28 is secured to the core casing 26 by a plurality of radially extending struts 30 positioned downstream of the downstream fan 16. The fan casing 28 defines the outer surface of a fan duct 32 which has an inlet 34 and an outlet 36.

The upstream fan 14 comprises a rotor 38 which has a plurality of circumferentially arranged radially inwardly extending struts 40, and a plurality of circumferentially arranged radially outwardly extending fan blades 42. The downstream fan 16 comprises a rotor 44 which has a plurality of circumferentially arranged radially inwardly extending struts 46, and a plurality of circumferentially arranged radially outwardly extending fan blades 48.

The rotors 38 and 44 in conjunction with a portion of the core casing 26 define the inner surface of the fan duct 32.

The compressor 18 is driven by the high pressure turbine 22 via a shaft 50, and the upstream fan 14 and downstream fan 16 are driven by the low pressure turbine 24 via a shaft 52 and a gear assembly 54. The gear assembly comprises a sun gear 56 secured to and driven by the shaft 52, a plurality of planet gears 58 which are arranged to mesh with and be driven by the sun gear 56, and an annulus gear 60 which meshes with and is driven by the planet gears 58. The gear assembly 54 is positioned axially between the upstream and downstream fans.

The annulus gear 60 is drivingly coupled to the radially inner ends of the struts 40 so as to drive the upstream fan 14. The planet gears 58 are rotatably mounted on a planet carrier 62, and the planet carrier 62 is drivingly coupled to the radially inner ends of the struts 46 so as to drive the downstream fan 16 in the opposite direction to the upstream fan 14. The upstream fan 14 is rotatably mounted on the planet carrier 62 by axially spaced bearings 64 and 66, the bearings being positioned on either side of the gear arrangement 54. The planet carrier 62 is rotatably mounted on the shaft 52 by a bearing 68 positioned upstream of the gear assembly 54 and is rotatably mounted on a static axially extending structure 76 by bearings 70 and 72 which are positioned downstream of the gear assembly 54. A bearing 74 rotatably mounts the shaft 52 in the static structure 76 downstream of the gear assembly 54.

The static structure 76 is secured at its downstream end to the radially inner ends of a plurality of radially extending struts 78, and the radially outer ends of the struts 78 are secured to the core casing 26. The struts 78 extend across an annular duct 80 which supplies air to the compressor 18 of the core engine 12. The annular duct 80 has an inlet 82 at its upstream end, and the outer surface of the annular duct 80 is defined by the rotors 38 and 44 and a portion of the core casing 26.

The booster compressor 84 is positioned upstream of the upstream fan 14 and comprises the rotor 38 which carries a plurality of circumferentially arranged radially inwardly extending blades 86, arranged in two axially spaced stages, and a rotor 88 which carries a plurality of circumferentially arranged radially outwardly extending blades 90, arranged in two axially spaced stages.

The rotor 38 and blades 86 are driven with the upstream fan 14, and the rotor 88 and blades 90 are driven directly by the low pressure turbine 24 via the shaft 52. The rotor 38 and the rotor 88 are driven in opposite directions.

Air flowing through the inlet 82 is compressed by the booster compressor 84, and then flows through the annular duct 80, passing between the struts 40 and 46 of the upstream fan 14 and downstream fan 16 respectively, to the compressor 18 of the core engine 12. The counter-rotating fans have improved efficiency over a single fan, and the positioning of the gear assembly axially between fans reduces the length of the engine, reduces the overhang of the fans and produces a stiffer structure. The static structure 76, vanes 78, core casing 26 and struts 30 form the stiff structure, and the engine is suitably mounted from an aircraft at the position where the vanes 78 and struts 30 are secured to the core casing 26.

The counter-rotating booster compressor has improved efficiency over a booster compressor with a rotor and a stator, and the positioning of the booster compressor upstream of the upstream fan allows an undisturbed flow of air into the booster compressor compared to an arrangement in which the booster compressor is positioned downstream of the fan and in which the flow of air is disturbed by the fan before flowing into the booster compressor.

Figure 2:
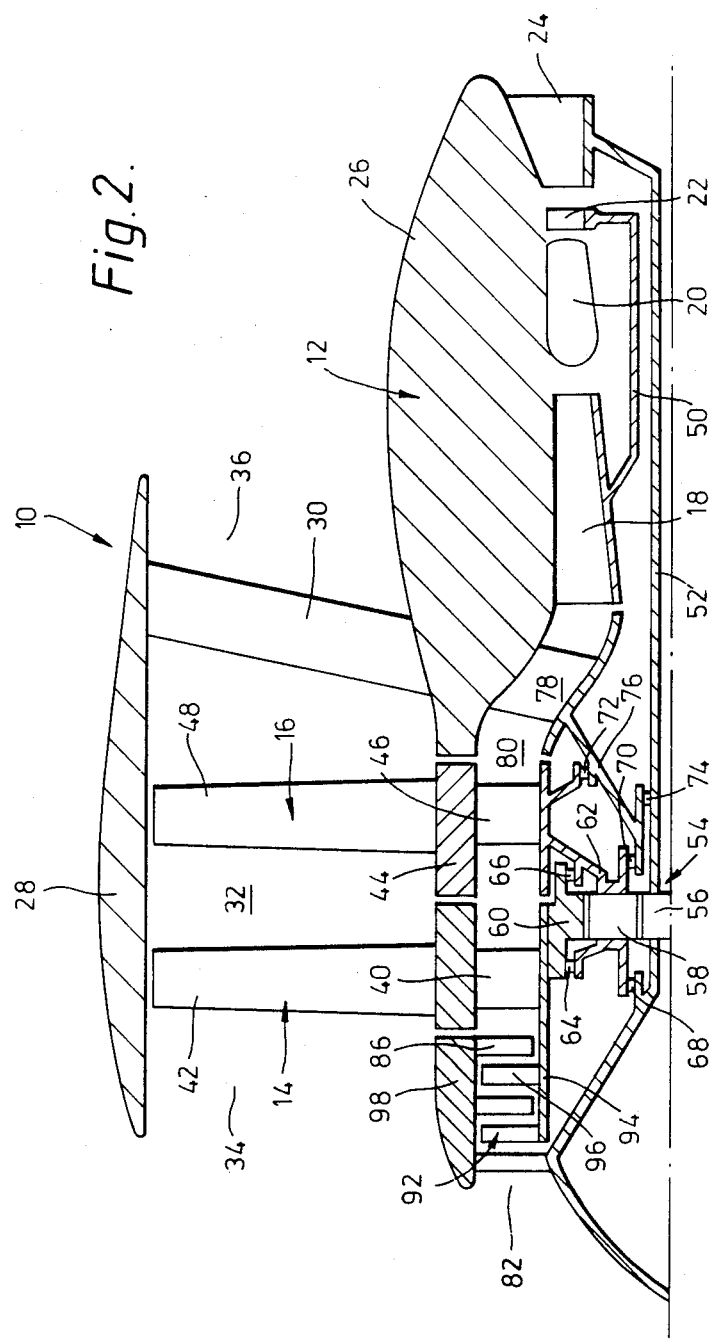
FIG. 2 shows a second embodiment of a turbofan gas turbine engine according to the present invention.

The embodiment in FIG. 2 is essentially the same as that shown in FIG. 1, but has a different booster compressor 92 arrangement. The booster compressor 92 is also positioned upstream of the upstream fan 14 and comprises a rotor 94 which carries a plurality of circumferentially arranged radially outwardly extending blades 96 arranged in two axially spaced stages, and a rotor 98 which carries a plurality of circumferentially arranged radially inwardly extending blades 100, arranged in three axially spaced stages.

The rotor 94 and blades 96 are secured to the radially inner ends of the struts 40, and are driven with the upstream fan 14, and the rotor 98 and blades 100 are driven directly by the low pressure turbine 24 via the shaft 52. The rotor 94 and the rotor 98 are again driven in opposite directions.

I claim:

1. A turbofan gas turbine engine comprising a core engine, an upstream fan, a downstream fan, a booster compressor and a gear assembly,
   the core engine comprising in flow series a compressor means, a combustor means and a turbine means,
   the upstream fan and the downstream fan being positioned upstream of the core engine,
   the gear assembly being driven by the turbine means, the gear assembly being positioned axially between the upstream fan and the downstream fan, the gear assembly being arranged to drive the upstream fan and the downstream fan in opposite directions,
   the booster compressor being positioned upstream of the upstream fan and the downstream fan, the booster compressor comprising a first rotor and a second rotor, the first rotor carrying a plurality of radially extending blades and the second rotor carrying a plurality of radially extending blades, the first rotor being driven with the upstream fan and the second rotor being driven directly by the turbine means, the first rotor and the second rotor rotating in opposite directions.

2. A turbofan gas turbine engine as claimed in claim 1 in which the gear assembly comprises a sun gear, a plurality of planet gears, an annulus gear and a planet gear carrier,
   the planet gears meshing with the sun gear and the annulus gear, the planet gears being rotatably mounted in and arranged to drive the planet carrier, the planet carrier being drivingly connected to the downstream fan and the annulus gear being drivingly connected to the upstream fan.

3. A turbofan gas turbine engine as claimed in claim 1 in which the first rotor of the booster compressor has a plurality of radially inwardly extending blades, and the second rotor of the booster compressor has a plurality of radially outwardly extending blades.

4. A turbofan gas turbine engine as claimed in claim 1 in which the first rotor of the booster compressor has a plurality of radially outwardly extending blades, and the second rotor of the booster compressor has a plurality of radially inwardly extending blades.

5. A turbofan gas turbine engine as claimed in claim 2 in which the upstream fan is rotatably mounted on the planet carrier.

6. A turbofan gas turbine engine as claimed in claim 5 in which the upstream fan is rotatably mounted on the planet carrier by axially spaced bearings, the bearings being positioned axially on each side of the gear assembly.

7. A turbofan gas turbine engine as claimed in claim 2 in which an axially extending static structure is secured to the core casing, the downstream fan being rotatably mounted on the axially extending static structure.

8. A turbofan gas turbine engine as claimed in claim 7 in which the downstream fan is rotatably mounted on the axially extending static structure by axially spaced bearings.

* * * * *